July 4, 1967
H. L. HARRISON
3,329,089
RETENTION-RELEASE MECHANISM FOR REACTION
MOTORS AND ROCKET INTERSTAGES
Filed Dec. 24, 1964
2 Sheets-Sheet 1
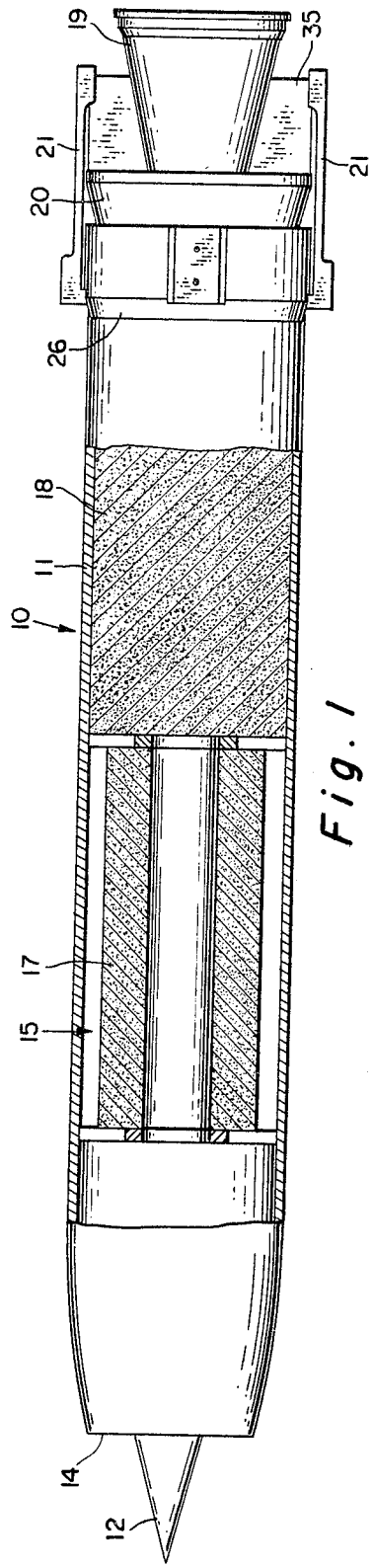
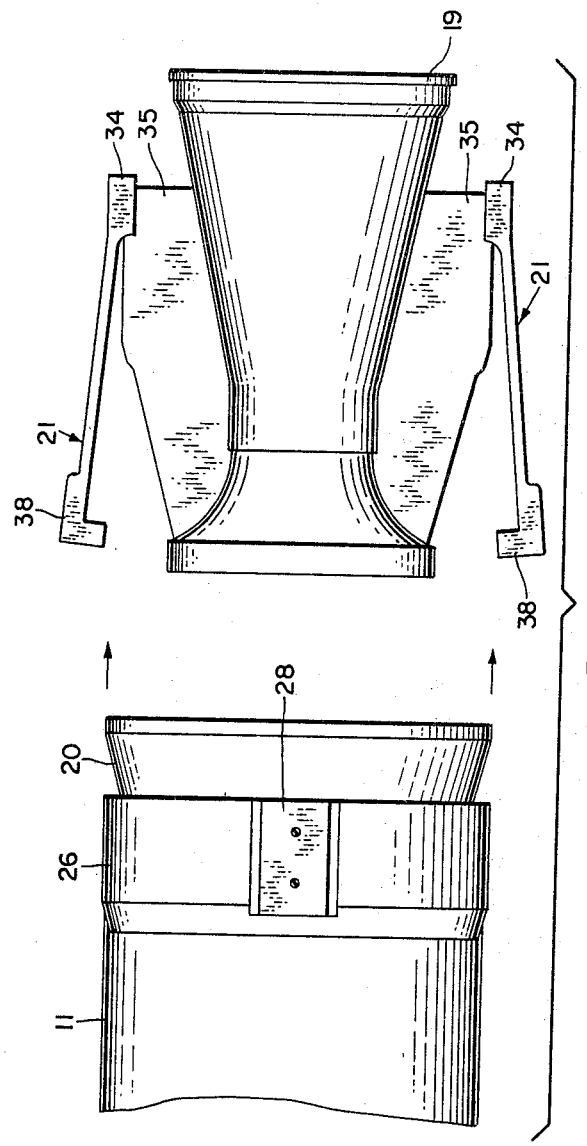
INVENTOR.
HERBERT L. HARRISON
BY C.E. Vautrain Jr. AGENT
Q. Baxter Warner
ATTORNEY

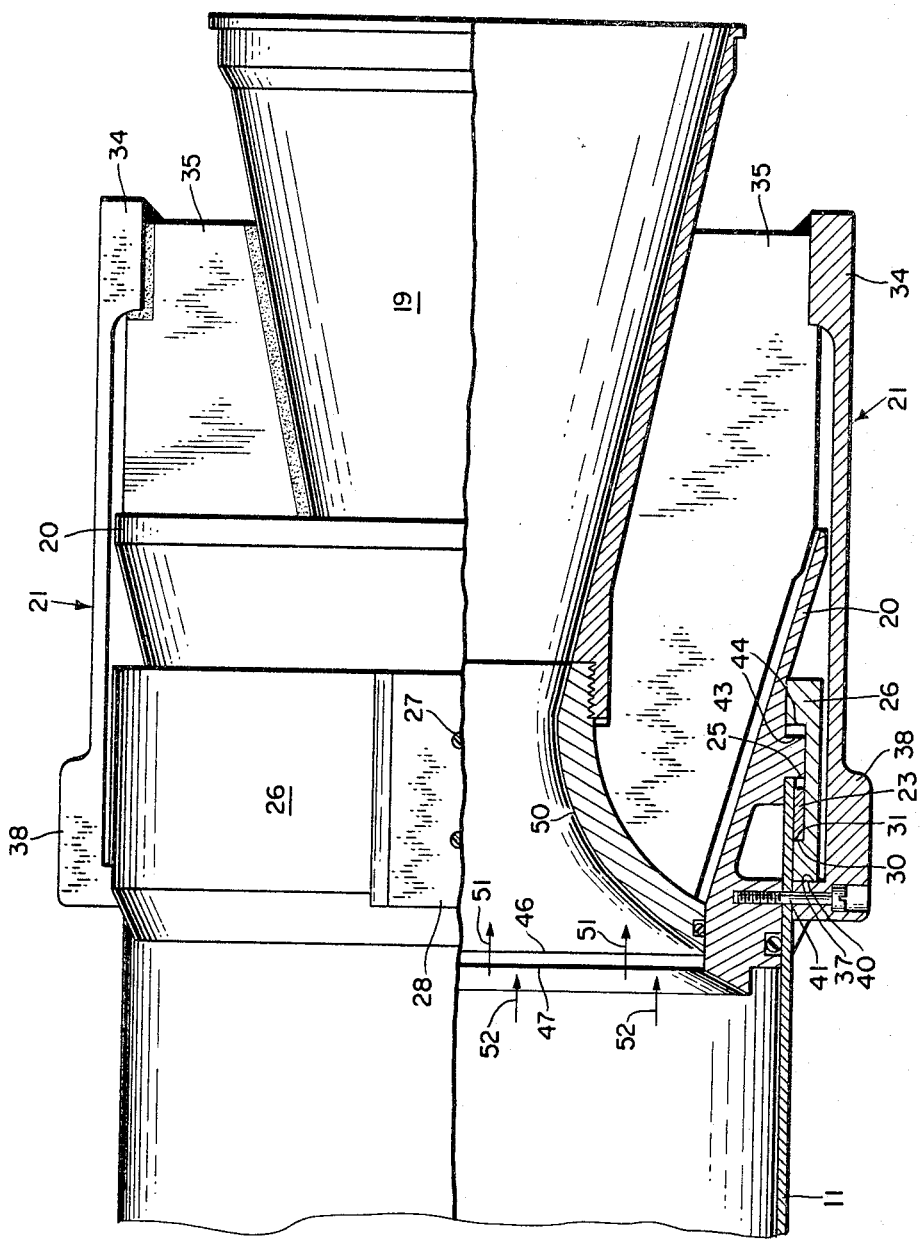

United States Patent Office 3,329,089
Patented July 4, 1967

3,329,089
RETENTION-RELEASE MECHANISM FOR REACTION MOTORS AND ROCKET INTERSTAGES
Herbert L. Harrison, Oxnard, Calif., assignor to the United States of America as represented by the Secretary of the Navy
Filed Dec. 24, 1964, Ser. No. 421,757
9 Claims. (Cl. 102—49.4)

The invention described herein may be manufactured and used by or for the Government of the United States of America for governmental purposes without payment of any royalties thereon or therefor.

The present invention relates to a method and means for releasing a nozzle or rocket motor from a sustainer motor or the next stage of a multi-stage rocket, and more particularly to a booster nozzle which is releasable from a sustainer motor or a ram-jet or other vehicle upon the occurrence of selected conditions in connection with the booster motor.

Releasable rocket nozzles have been developed for a particular purpose, namely, in ram-jet vehicles to separate a booster nozzle which is required to bring the vehicle to speeds at which the ram-jet engine map operate. In particular, Patent No. 3,040,517 discloses a releasable rocket nozzle which permits ejecting the booster nozzle from the vehicle after it has been initially propelled by the booster motor. There are, however, several disadvantages to the release mechanisms taught in the prior art some of which are a dependency on the burning of a wire or wires to actuate the mechanism or on the ejection of a central rod which is attached to the booster nozzle. The use of a retainer wire has proved undersirable because the wire, since it extends from the end of the vehicle body on either side of the booster nozzle to the trailing edge of the booster nozzle and then across the exhaust opening thereof thus is bent 90° in several places and also is exposed to damage or accidental breakage in handling or storing of the rocket vehicle. The prior art also is undesirable in that after the wire held mechanism has been released to an unstressed attitude it extends outward from the vehicle and produces undesired aerodynamic drag.

The devices in the prior art which utilize a rod centrally positioned in the combustion chamber and supported at the nozzle end of the rocket engine by webs extending to the throat portion are undesirable in that they impede the flow of exhaust gases and otherwise reduce the efficiency of the engine. Such centrally disposed rods have the further disadvantage of limiting the configuration of the solid propellant grain to that having an axial opening of sufficient diameter to accomodate the rod. The present invention avoids the disadvantages of prior retention-release mechanisms by requiring neither internal nor external appendages and thus interposing no impediments to exhaust gas generation and flow of air past the missile or rocket vehicle.

Accordingly, it is an object of the present invention to provide a method of and means for releasing a nozzle from a rocket vehicle which avoids interposing any of the components in the air stream of the vehicle.

Another object of the present invention is to provide a means of and method for releasing a first stage such as a booster and/or nozzle from a rocket vehicle which avoids the inaccuracies attendant actuation effected by burning of some of the components of the device.

It is a further object of this invention to provide a retention-release mechanism for releasing a nozzle or stage of a rocket vehicle from the vehicle in which the operative parts of the mechanism are ejected with the released stage or nozzle.

It is a still further object of the present invention to provide a release mechanism for releasing a booster nozzle from a ram-jet vehicle wherein release is accomplished in response to a predetermined decrease in pressure in the combustion chamber of the booster vehicle.

Other objects and many of the attendant advantages of this invention will be readily appreciated as the same becomes better understood by reference to the following detailed description when considered in connection with the accompanying drawings in which like numerals represent like components throughout and wherein:

FIG. 1 is a plan view, partly in section, of a ram-jet vehicle to which the present invention may be adapted;

FIG. 2 is an enlarged plan view, partly in section, of the after portion of the ram-jet vehicle of FIG. 1 showing the interrelation of the components of the present invention; and FIG. 3 is a plan view of the components of the invention after release has been effected.

Referring now to the drawings, there is shown in FIG. 1 one type of reaction motor vehicle 10 on which the instant invention may be employed, the particular embodiment utilizing combined rocket and ram-jet motors. Vehicle 10 comprises generally an outer cylindrical casing 11 having at a forward end a diffuser 12 concentrically spaced from the body to form a ram air inlet 14. Diffuser 12 serves to direct ram air into the annular combustion chamber of the vehicle while reducing its velocity and increasing its static pressure. The ram jet motor 15 may comprise a solid propellant grain 17 which may as shown have both external and/or internal burning surfaces. For the purpose of this invention, the jet motor could be of a liquid or solid propellant type or could be the motor of another rocket stage if desired.

The after assembly of the vehicle 10 shown in FIG. 1 includes propellant 18 which may be for a booster having a nozzle such as shown at 19 or for the first stage of a multi-stage rocket. Positioned forward of the nozzzle 19 is nozzle 20 which in the present embodiment is the nozzle for ram-jet engine 15 but which could in alternate embodiments be the nozzle for a second stage of the vehicle, and the retention-releasing means indicated generally at 21.

The after assembly of the embodiment is shown in greater detail in FIG. 2 wherein casing 11 of the vehicle is shown as having retaining means such as a retaining ring 23 secured to it near its after end by such means as welding or riveting. Ram-jet nozzle 20 abuts against the end of casing 11 at the forward edge of retaining ridge 25 of ram jet nozzle 20. With the ram-jet nozzle in position, a lock ring 26 is positioned over the retaining ring 23, the lock ring being shown in an external view in both FIGURES 1 and 2. Lock ring 26 preferably is a split ring which may be joined in any of several manners, that shown being a pair of set screws 27 inserted through a locking plate 28. The lock ring 26 is tightened in position with an aft facing bearing face 30 thereof engaging the forward facing bearing face 31 of retention ring 23. With the ram-jet nozzle secured in position in the manner described or in a like manner, the assembly is now ready for the insertion of booster nozzle 19 within the ram-jet nozzle 20.

FIG. 3 illustrates the booster 19 and its attached cantilever retention-release means such as spring 21 in their deployed position both before and after release from the vehicle 10. The cantilever springs may be attached to nozzle 19 in any of a variety of manners, that shown having the springs 21 welded at their after portion, indicated at 34, to frame members such as gussets 35 which in turn are welded or otherwise secured to nozzle 19. As shown in FIG. 3 the nozzle, with its attached cantilever springs deployed outward, is in the form for insertion into and attachment to the vechile 10. Nozzle 19 is inserted until the aft facing face 37 of retention head 38, as seen in FIG. 2, of the cantilever springs is positioned opposite the forward facing face 40 of lock ring 26. The assembly is completed by depressing the cantilever springs 21 until the inner surface of retention head 38 abuts against casing 11 of the vehicle. The cantilever springs may be restrained in this position by shear means such as shear bolts 41 which are inserted through openings in casing 11 and screwed or otherwise attached to ram-jet nozzle 20. A set of four such shear bolts is employed in the embodiment shown, however, fewer or more may be used as desired.

Of particular importance in the configuration of the components is the relation between the diameter of shear bolts 41, only one of which is shown, the space between the aft face of retaining ridge 25 indicated at 43 and the forward face 44 of the aft portion of lock ring 26, and the spacing of the forward edge of nozzle 19 indicated at 46 and the aft edge of the inwardly extending portion of ram-jet nozzle 20 indicated at 47. The above dimensions, that is the space between 43 and 44 and the space between lines 46 and 47 must be at least equal to the diameter of shear bolt 41 in the present embodiment, for reasons which will become apparent in the following description of operation.

The present method and means for releasing and ejecting a booster or booster nozzle or first stage nozzle or engine from a missile or other reaction powered vehicle eliminates a possibility of premature release and ejection before a selected pressure has been built up in the booster or first stage engine combustion chamber. The present invention also provides protection against damage in the various handling stages before launch, including storage and shipment, by having the operative components either internally disposed or by fastening external components in such a manner as to preclude accidental damage thereto.

With the component parts assembled as shown in FIG. 2, the ignition of and buildup of pressure in the booster or first stage motor will cause a force to be exerted against the forward throat portion of nozzles 19 and 20 as indicated, respectively, by arrows 51 and 52. Since nozzle 19 is held from movement aft by gussets 35, cantilever springs 21, lock ring 26 and retention ring 23 combustion chamber pressure should have no effect in causing movement of the nozzle with respect to vehicle body 11. As to ram-jet nozzle 20, however, the combustion chamber pressure indicated by arrows 52 will be transmitted through the ram-jet nozzle to shear pins 41 and upon reaching a predetermined pressure will cause pins 41 to be sheared thereby resulting in movement rearward of the ram-jet nozzle with respect to vehicle body 11. The distance the ram-jet nozzle is moved rearward is controlled or limited by the spacing between faces 43 and 44. Thus, a selected pressure in the combustion chamber has the result of movement only of ram-jet nozzle 20. By providing a space between faces 43 and 44 equal in distance to the diameter of shear bolt 41, the movement of ram-jet nozzle 20 is restricted to a distance sufficient to cause a complete shear of shear bolt 41. After shearing bolt 41, the ram-jet nozzle abuts against lock ring 26 thereby restraining the nozzle from further movement aft. The selected distance of movement of ram-jet nozzle 20 also will bring lines 46 and 47 into juxtaposition thereby causing the adjoining surfaces of nozzles 19 and 20 into agreement so as to present a single smooth surface to the exiting gases. Thus, the flow of gases is not interrupted or impeded so as to cause erosion of either of the nozzles at the line of juncture.

The preselected force required to shear bolts 41 represents a combustion chamber pressure which will cause face 37 of retention head 38 to bear against face 40 of lock ring 26 with sufficient force to prevent cantilever springs 21 from moving outward to the unstressed condition shown in FIG. 3. Since bolts 41 have been sheared, the friction between faces 37 and 40 is all that prevents outward movement of springs 21. Cantilever springs 21 will be retained in the position shown in FIG. 2 until combustion chamber pressure decays to a preselected value which will permit the inwardly biased cantilever springs to overcome the frictional restraint and move retention heads 38 outward beyond engagement with lock ring 26. With the cantilever springs released, nozzle 19, gussets 35 and springs 21 may be forced rearward by the exhaust gas pressure exerted on throat 50 thereby ejecting these components from vehicle 10. Ram-jet nozzle 20 is retained in position during ejection of nozzle 19 being restrained by lock ring 26 and retainer ring 23.

It is now apparent that the embodiment of the invention shown and described herein avoids the deficiencies of prior retention-release means by providing first a more sensitive actuation method, that is, having the shear bolts 41 severed upon the occurrence of selected pressure against the forward portion of ram-jet nozzle 20, and second by having the cantilever springs 21 carried off with the ejected nozzle thereby precluding them from causing undesired drag on the vehicle 10. The present embodiment further improves over existing devices in that the movement of the ram-jet nozzle is more accurately accomplished than by having wires severed by heat which severing may occur within rather wide limits of temperature and therefore time. Additional parts are eliminated in the present device in that the ram-jet nozzle itself is the actuating member. In this respect, although other appendages may be used to actuate and release the cantilever springs 21 it will be appreciated that such appendages would complicate the operation and present more possibilities for malfunction to occur. Therefore, the present embodiment presents a decidedly superior method and means for accomplishing ejection of a booster nozzle or of a first stage motor.

The assembly and production of the present embodiment of the invention, using shear bolts or similar shear means, lends itself more readily to repeated operation on production lots of missiles or other reaction motors. The present invention also eliminates the problem of having to prepare a rocket motor booster grain in such a configuration so as to match an internally carried retaining rod or a separator plate or both, and as well eliminates the possibility of premature ejection of the booster nozzle due to such an internal retainer rod burning through on motors having a long duration burn time.

The method and means of releasing the booster nozzle as described in the present embodiment are also applicable to releasing the stages of a multi-stage rocket from one another.

It will be recognized that many modifications and variations of the present invention are possible in the light of the above teachings. It is therefore to be understood that within the scope of the appended claims the invention may be practiced otherwise then as specifically described.

I claim:
1. A release device responsive to combustion chamber pressures within a reaction motor vehicle having at least two stages comprising:
forwardly extending retention means connected to the first stage of said vehicle;
forward facing bearing surface means on at least a second stage of said vehicle;
said retention means having a rearward facing bearing surface frictionally engaging said forward facing bearing surface means during the occurrence of a selected pressure in the combustion chamber of the first stage;
said frictionally engaged surfaces becoming disengaged upon the occurrence of a pressure less than said selected pressure; and
the first stage of said vehicle including said retention means being discharged aft from said vehicle by the continued flow of exhaust gases therefrom,
whereby release of the first stage of said vehicle is effected without affecting the aerodynamic characteristics of the remaining stages of the vehicle.

2. A release device responsive to combustion chamber pressures within a reaction motor vehicle having at least a booster engine and a ram-jet engine comprising:
   a detachable nozzle in said booster engine;
   said nozzle including forwardly extending means releasably engaging said vehicle;
   said means releasable upon the buildup of pressure to a selected pressure in a combustion chamber of said vehicle;
   a rearward facing frictional bearing surface on said forwardly extending means engaging a forward facing frictional bearing surface on said vehicle for holding said nozzle to said vehicle during the continuance of a selected pressure in said combustion chamber; and
   said nozzle ejected from said vehicle upon decay of said selected pressure to a minimum selected pressure;
   whereby release of said nozzle is effected without affecting the aerodynamic characteristics of said reaction motor vehicle.

3. The device is defined in claim 2 wherein one of said bearing surface means is a portion of at least a pair of cantilever springs attached at one end to the aft portion of said nozzle.

4. A release device responsive to combustion chamber pressure within a reaction motor vehicle having at least a booster engine and a ram-jet engine comprising:
   spring biased retention means exteriorly attached to the nozzle of said booster engine;
   a forward facing surface on said vehicle;
   said retention means including a rearward facing surface initially spaced from and adapted subsequently to be held in juxtaposition against said forward facing surface;
   releasable connecting means connecting said retention means and said vehicle so as to place said surfaces in juxtaposition with one another upon the occurrence of a selected pressure in said booster engine;
   said connecting means severable upon the occurrence of said selected pressure in the combustion chamber of said booster engine;
   said selected pressure sufficient to frictionally oppose said spring biased retention means and prevent said rearward facing surface from sliding outward from said forward facing surface; and
   said spring biased retention means exerting a sufficient outward force to overcome the force of friction between said surfaces upon decay of combustion chamber pressure to a pressure less than said selected pressure,
   whereby said booster engine will be disengaged from said vehicle and the exhaust gases of said ram-jet engine will expedite separation of the booster engine and the vehicle.

5. The device as defined in claim 4 wherein said connecting means connects said spring biased retentions means and the nozzle of said ram-jet engine.

6. The device as defined in claim 5 and further including a movable ram-jet nozzle; said connecting means being severed upon movement of the ram-jet nozzle rearward a selected distance.

7. A release device responsive to combustion chamber pressure within a reaction motor vehicle having at least a booster engine and nozzle and a ram-jet engine and nozzle comprising:
   a pair of cantilever springs exteriorly attached to the aft portion of said booster engine nozzle;
   said springs extending forward and each having a head portion which extends inward adjacent the throat of the nozzle;
   a rearwardly facing surface on each of said head portions;
   the throat portion of said booster noozle insertable within the throat portion of said ram-jet nozzle;
   said ram-jet nozzle displaceably attached to the aft portion of said vehicle;
   said vehicle including a forward facing surface adjacent the throat of said ram-jet nozzle;
   said head portion being positioned opposite the throat portion of said ram-jet nozzle when the booster nozzle is fully inserted within the ram-jet nozzle;
   severable means securing each head portion to said vehicle and said ram-jet nozzle; and
   said rearwardly facing and forward facing surfaces abutting one another when said head portions are secured to the vehicle and the ram-jet nozzle;
   whereby upon thrust buildup in said booster engine said severable means will be severed allowing displacement aft under combustion chamber pressure of said ram-jet nozzle and simultaneously holding said rearwardly facing and forward facing surfaces in position thereby maintaining the booster nozzle in attachment with the vehicle until combustion chamber pressure declines so as to permit movement of said springs outward to an unbiased position.

8. The device as defined in claim 7 wherein the throat portion of said ram-jet nozzle is displaced forward of the throat portion of said booster nozzle when said head portions are secured to the vehicle and the ram-jet nozzle; and
   the throat portion of said ram-jet nozzle being moved into alignment with the throat portion of the booster nozzle upon severance of said severable means and displacement aft of said ram-jet nozzle.

9. The method of releasably engaging components of reaction motor vehicles comprising the steps of:
   severably engaging an aft positioned component and the aft end of a vehicle;
   disengaging the component upon the occurrence of a first selected pressure condition;
   frictionally engaging the component and the vehicle upon the occurrence of said first selected pressure condition; and
   releasing the component together with the means for frictionally engaging it from the vehicle upon the occurrence of a second selected pressure condition;
   so that the component and its engaging means are dissociated from the reaction motor vehicle under selected pressure conditions leaving no undesired appendages attached to the vehicle.

References Cited
UNITED STATES PATENTS

| | | | |
|---|---|---|---|
| 2,968,245 | 1/1961 | Sutton et al. | 102—49 |
| 3,011,309 | 12/1961 | Carter | 102—49 |
| 3,040,517 | 6/1962 | Ryden et al. | 102—49 |

BENJAMIN A. BORCHELT, *Primary Examiner.*

SAMUEL FEINBERG, *Examiner.*

V. R. PENDEGRASS, *Assistant Examiner.*